(No Model.)
W. C. MATTESON.
SEEDER ATTACHMENT FOR GANG PLOWS.
No. 594,091. Patented Nov. 23, 1897.
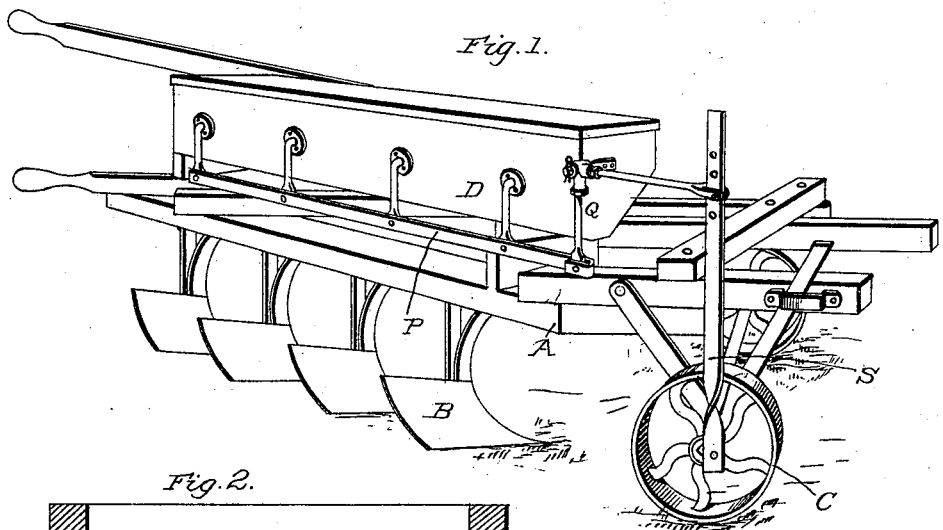
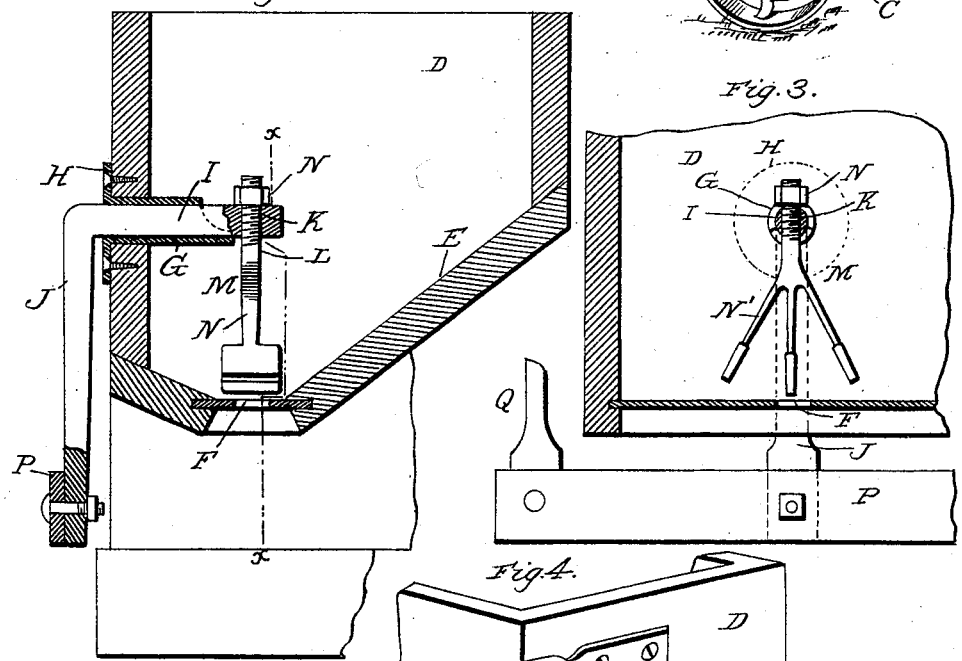
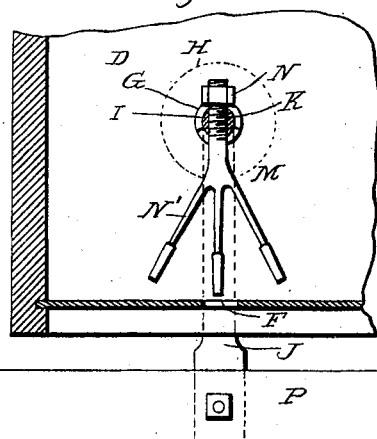
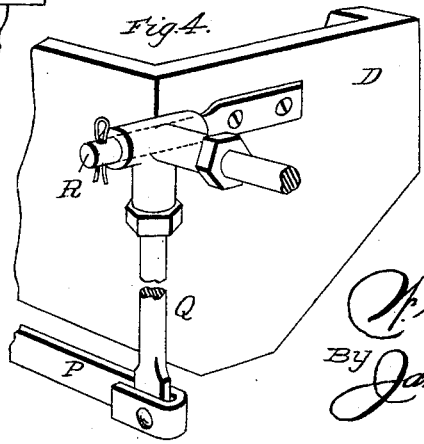
Witnesses:
Inventor
W. C. Matteson
By James Sheehy
Attorney

UNITED STATES PATENT OFFICE.

WALTER C. MATTESON, OF STOCKTON, CALIFORNIA.

SEEDER ATTACHMENT FOR GANG-PLOWS.

SPECIFICATION forming part of Letters Patent No. 594,091, dated November 23, 1897.

Application filed December 21, 1896. Renewed October 14, 1897. Serial No. 655,207. (No model.)

*To all whom it may concern:*

Be it known that I, WALTER C. MATTESON, a citizen of the United States, residing at Stockton, in the county of San Joaquin and State of California, have invented certain new and useful Improvements in Seeders for Gang-Plows; and I do declare the following to be a full, clear, and exact description of the invention, such as will enable others skilled in the art to which it appertains to make and use the same.

My invention relates to improvements in seeders for gang-plows and the like; and it has for its general object to provide a cheap, simple, and durable seeder adapted to be used on an ordinary gang-plow or the like and one which is capable of discharging the seed evenly and regularly and which is adapted to effectually prevent clogging of the outlets by the seed.

Other objects and advantages of the invention will be fully understood from the following description and claims when taken in conjunction with the annexed drawings, in which—

Figure 1 is a perspective view of a gang-plow equipped with my improved seeder. Fig. 2 is an enlarged transverse section taken through the seedbox of the seeder. Fig. 3 is a detail section taken in the plane indicated by the line $x\ x$ of Fig. 2; and Fig. 4 is a detail perspective view of one end of the seedbox, showing the mechanism thereon.

Referring by letter to the said drawings, A indicates the main frame of a gang-plow, B indicates the several plows thereof, and C indicates one of the traveling wheels, all of which may be of the ordinary or any suitable construction.

D indicates the seedbox, which is arranged upon the frame A in a plane above the several plows B, and is connected to said frame in any suitable manner. This box D is provided in its bottom E, which is preferably shaped as shown, with outlets F, corresponding in number to the number of plows employed, which outlets are designed to permit the seed to pass from the box into depending spouts (not illustrated) and be discharged therefrom upon the ground. The said box D is also provided in its rear wall at intervals with the inwardly-extending sleeves G, which have flanges H at their outer ends whereby they may be readily connected to the rear wall of the box. In these sleeves G are journaled crank-shafs I, which have depending arms J at their outer ends, and are provided adjacent to their inner ends, which rest above the outlets F, with threaded apertures K, for the reception of the threaded shanks L of the agitators M, which threaded shanks extend above the crank-shafts and are provided with nuts N, which are designed, by bearing tightly upon the crank-shafts, to prevent casual turning of the agitators therein.

At the lower ends of their shanks L the agitators M are provided with the diverging branches N', which have enlargements at their lower ends designed to swing in opposite directions above and closely adjacent to the outlets when the shafts I are rocked and thereby accelerate the passage of seed through the said outlets and prevent choking of the same.

The lower ends of the arms J of the several crank-shafts I are connected by a bar P, and this bar P, in turn, is connected to one arm of a bell-crank lever Q, which is fulcrumed on a support R, connected to one end of the box D, as shown. The other arm of the said bell-crank lever Q is connected to a pitman S, connected to a spoke of one of the traveling and supporting wheels C, whereby it will be observed that when the plow is drawn forward and the traveling wheel is rotated, the lever Q will be rocked, the bar P reciprocated, and the agitators oscillated at a speed corresponding to that of the traveling wheel to accelerate the discharge of the seed from the box D, as before described.

It is desirable to change the throw of the agitator M to suit different conditions and kinds of seed, and to this end I provide a plurality of apertures in the pitman S, so that the bell-crank levers can be connected to the same at different points.

In the practical operation of the invention the seedbox D is charged with seed and the plow is drawn forward in the usual manner, when the seed will be discharged from the box evenly and regularly and will fall so as to be covered by the earth raised by the plows B.

It will be observed that my improvements are very cheap and simple and that they may be applied to gang-plows such as at present in use without changing the construction thereof.

It will also be observed that in virtue of the employment of the crank-shafts I, carrying the agitators M, and having the arms J, the bar P, connecting the lower ends of the several arms J, the pitman connected to the traveling wheel, and the bell-crank lever interposed between and connecting the pitman and the bar P a great leverage is afforded, and consequently free and smooth working of the mechanism is insured and the same is prevented from increasing the draft, which is an important advantage.

Having described my invention, what I claim is—

1. The herein-described seeder consisting essentially of the main frame, plows connected to and depending from the main frame, a traveling wheel connected to and supporting the main frame, a seedbox arranged on the main frame and having outlets in its bottom at intervals in the length thereof, sleeves arranged in the rear wall of the seedbox in the same vertical planes as the outlets, crank-shafts journaled in said sleeves and having depending, angular arms at their outer ends, the agitators connected to the said crank-shafts and arranged and adapted to move over the outlets in the bottom of the box, the support R, connected to one end of the seedbox and extending in rear of the same, the bell-crank lever fulcrumed on said support R, and resting in alinement with the depending arms of the crank-shaft, the bar P, connecting the lower ends of the several arms of the crank-shaft and the depending arm of the bell-crank lever, and the pitman connected to the other arm of the bell-crank lever and also connected to the traveling wheel of the center of the same, all substantially as and for the purpose set forth.

2. In a seeder the combination of a plow having traveling wheels, a seedbox arranged on the plow-frame and having an outlet in its bottom, a sleeve fixed in the wall of the box, in the same vertical plane as the outlet a crank-shaft journaled in said sleeve and having an arm at its outer end, an agitator connected to the crank-shaft and arranged and adapted to oscillate over the outlet in the bottom of the seedbox, the support R, connected to one end of the seedbox and extending in rear of the same, a bell-crank lever fulcrumed on said support and resting in alinement with the arms of the crank-shaft, a bar connecting the depending arm of said lever and the arm of the crank-shaft and a pitman connected at one end to the other arm of the lever and at its opposite end to one of the traveling wheels, substantially as specified.

In testimony whereof I affix my signature in presence of two witnesses.

WALTER C. MATTESON.

Witnesses:
W. E. WILLIAMS,
O. H. ECCLESTON.